Patented Aug. 26, 1947

2,426,395

UNITED STATES PATENT OFFICE 2,426,395

CERAMIC COMPOSITION

Kelsey I. Harvey, Beaver, Pa.

No Drawing. Application May 22, 1939,
Serial No. 275,058

3 Claims. (Cl. 106—47)

This invention relates generally to a novel ceramic composition and more specifically to a vitrified ceramic composition which may be used to produce glass-like articles, a bond or a glaze or other similar products.

The principal object of this invention is the provision of a novel vitrified ceramic composition.

Another object is the provision of a ceramic compound which when vitrified has a high fluxing characteristic.

Another object is the provision of a ceramic composition having a relative long range of vitrification as compared with other ceramics.

Another object is the provision of a novel ceramic composition for producing articles which are very tough and hard.

Another object is the provision of a novel ceramic composition which is economical for use in manufacturing glass-like articles, bonds, glazing, enameling or other similar products.

Other objects appear in the following description and claims.

The ceramic composition which forms the subject matter of this invention is preferably made up of compounds containing the elements boron, lead and lithium. The boron and the lead are preferably added in a compound of their oxide form such as borax, boric acid, and litharge red or white lead oxide and the lithium as lepidolite. However the lead and lithium may be obtained from a compound such as a salt or chloride, a nitrate, a carbonate or a phosphate.

Boric acid is considered the best form in which to obtain the boron, and it is preferable to employ it in its granulated or powdered state. The boric acid is believed to make the product more elastic, thus producing a tougher and less brittle characteristic. It is also believed that it contributes to the lengthening of the range of vitrification and that it decreases the viscosity of a batch.

Borax may be used in place of boric acid but it should be treated as sodium oxide and boric acid as they appear to act independently. The sodium radical in the borax produces a greater fusion and fluxing agent and is believed to reduce the viscosity of a batch more than boric acid. Thus in some applications of this ceramic composition it may be preferable to use borax in place of boric acid, depending upon the characteristics desired. Boron may be added in other forms. However it is more economical to use boric acid or borax, unless it is particularly desirable to add another element that is to combine with the nascent elements liberated when vitrifying the batch.

Lead monoxide is given as a preferred element in this composition principally because it is inexpensive and easily obtained. Any of the lead oxides may be used but the most economical is lead monoxide or litharge. Care must be taken when using litharge to avoid lead poisoning. However with proper handling of the material and venting of the batch when heating, poisoning may be averted. Fritted lead glasses may be used to avoid these difficulties and they have the same effect on fusibility as boric oxides.

White lead and red lead may be used, providing the equivalents of lead monoxide are present, which is an important rule of this basic ceramic. Lead carbonate or lead sulfide may also be used by observing the same rule. The use of these ingredients depend upon the ultimate use of this ceramic, and in many cases it may be desirable to employ them. In the case of lead carbonate it is essential that vitrification be maintained uniformly through the product or the exterior may form a seal and prevent the escape of the carbon in the form of carbon dioxide, thus producing a blackened weak structure. Lead chromate may also be substituted for litharge.

One or more of the group including compounds containing potassium, sodium, calcium, magnesium, zinc and tin may be used individually in place of any one of the ingredients in this ceramic. However, compounds of each of these elements add their singular characteristics to the composition, yet they all have about the same effect on the fusibility of the composition. Probably the most noticeable difference in the use of some of these is that they tend to make it more brittle. In some applications this may be highly desirable, whereas in others it may be preferable to maintain a softer product. Compounds containing titanium, zirconium, cobalt, copper and barium have the effect of tempering the product. Some of these are too expensive to use commercially, especially in view of the beneficial results obtained with boric acid, litharge and lepidolite which are relatively cheap. However compounds containing copper and barium are easily obtainable. They may be used as a substitute for one of the ingredients or they may be used in addition thereto for tempering the composition. Barium nitrate is also effective when added in the presence of lead, as the nitrate avoids the formation of metallic lead during the melting if such difficulty be experienced.

The proportions of the boric acid, litharge and lepidolite may vary from 10% to 60% by weight of the batch. However it has been found that the most satisfactory results may be obtained by adding these ingredients in equal proportions by weight. Where commercially pure forms of boric acid, litharge and lepidolite are used the relative percentages which results in a batch containing approximately fifteen parts by weight of boron, sixteen parts by weight of lead and six parts by weight of lithium may be employed.

If the compounds of these elements are added in other commercial forms the proportions used in making up the batch should be such as to provide approximately the same relative percentages of boron, lead and lithium as stated above. When lithium nitrate is used in place of lepidolite, approximately nine parts by weight should be employed with 33⅓ parts by weight of boric acid and 33⅓ parts by weight of litharge. To obtain the desired proportion of lithium carbonate, 15 parts by weight should be used in the batch. In substituting boron and lead in different forms the same proportions should be carried out to obtain what has been found to produce the best results.

As stated above the proportions of these ingredients may be varied between 10% and 60% by weight on the basis of using boric acid, litharge and lepidolite. Batches including these varied proportions may be easily calculated by setting up a triaxial diagram using these three ingredients.

If it is desired to employ other chemicals or compounds containing boron lead and lithium another triaxial diagram may be made by transposing the chemical on the basis of the number of parts by weight in which the chemical contains one of these basic elements as illustrated above in connection with the use of lithium, nitrate and lithium carbonate.

Compounds containing boron, lead and lithium constitute one of the preferred compositions of this ceramic. This composition is very similar to a glass but it is believed inaccurate to term the raw batch a glass, because it does not contain silica as a principal or significant ingredient. However, it resembles glass in appearance and has many characteristics in common with glass in that the addition of certain elements thereto produce different effects, some of which are well known.

Again this composition can not be classed among the ceramics made from clay, yet it may be used in some products as a substitute of the clay, especially in instances where the clay forms a part of the bond. Clays and slips destroy the best features of this ceramic and tend to change it into a clay product as their proportions are increased in the batch. The disintegration of the clays caused by steam generated in the batch during the process of vitrification creates the undesirable characteristics such as disintegration of the piece unless heated and cooled very slowly which are foreign to the ceramic of the present invention, but common to other well known vitreous ceramics which are products of clay. Thus the use of clay should be avoided in making this ceramic. Of course a small amount of clay, insufficient to destroy the principal characteristics of this ceramic might be added without avoiding the scope of this invention, for it is obvious that a relatively small proportion of clay would not impair the beneficial results of this ceramic. However to obtain the best results clays should not be used.

Silica is present in this ceramic owing to the use of lepidolite from which the lithium is obtained, but lithium nitrate, salts, carbonate or phosphates may be used, in which case there would be no silica. Lepidolite is relatively inexpensive and may be readily obtained, and is therefore preferable in making up this ceramic. The silicate of aluminum in lepidolite does not detract from the character of the product. The lithium and fluorine are conducive to lowered viscosity and rapidity in melting because of their active fluxing properties, which are marked characteristics of this ceramic. When a compound containing one of the elements including the group of lithium, sodium, potassium, calcium, magnesium, tin, zinc and fluorine are used by themselves as one of the three ingredients in the mix they have a tendency to shorten the range of vitrification. However the range of vitrification of this ceramic is much longer than any known in the ceramic art.

This ceramic has a low coefficient of expansion and therefore may be subjected to sudden heating or cooling and is less likely to fracture. This is an important advantage in the making of articles or otherwise using this ceramic. It vitrifies at materially low temperature but also may withstand high temperatures and thermal shocks without impairing its characteristics, and the product may be quickly cooled as by removing it from the heat of formation to ordinary room temperature without waiting for the annealing or slow cooling operations necessary in the manufacture of other products of this general nature. This is a material advantage of this invention. This ceramic has a relatively long range of vitrification and will withstand sudden changes in temperature.

By adding a sufficient amount of silica this ceramic may be converted into a glass. But most glass batches contain substantially forty-five percent or more of silica. The addition of silica in increasing proportions to this ceramic gradually changes its characteristics, making it brittle. However a glass made with forty-five percent or more silica with this ceramic is unlike any known glass but it behaves quite similar to the well known borax glasses which do not contain lithia. Glass made with this composition is very tough and is less brittle than the other borax glasses. It will withstand sudden changes in temperature and it is durable.

A mix of boric acid, lepidolite and litharge within the proportions given above will sinter from about 150° F. to 400° F. and will weld forming a glass like material at a temperature approximating 450° F. to 750° F. when the heat is applied for a relatively short time. However lower temperatures may be employed by the application of heat for a longer period of time. If a compound containing one of the elements in the above mentioned group that includes potassium is used as a substitute in place of lepidolite or litharge or other oxide compound the mix will sinter at approximately 200° F. to 500° F. and the melting temperature is approximately 1000° F. to 1400° F. However the substitution of these elements for boric acid produces a mix having temperature characteristics approaching that of the element added.

I claim:

1. A composition of the character described consisting of thirty-three and one-third parts by weight of boric acid, thirty-three and one-third parts by weight of litharge, and nine parts by weight of lithium nitrate.

2. A composition of the character described consisting of thirty-three and one-third parts by weight of boric acid, thirty-three and one-third parts by weight of litharge, and fifteen parts by weight of lithium carbonate.

3. A ceramic composition of the character described consisting of substantial proportions of boric acid, litharge and lepidolite.

KELSEY I. HARVEY.

REFERENCES CITED

The following references are of record in the file of this patent:

UNITED STATES PATENTS

| Number | Name | Date |
|---|---|---|
| 1,261,015 | Enequist | Apr. 2, 1918 |
| 1,443,813 | D'Adrian | Jan. 30, 1923 |
| 1,626,042 | Locke | Apr. 26, 1927 |
| 1,927,737 | Eisenlohr | Sept. 19, 1933 |
| 2,007,349 | Schertel | July 9, 1935 |
| 2,020,559 | Malinovszky et al. | Nov. 12, 1935 |
| 1,583,901 | Schurecht | May 11, 1926 |
| 1,583,902 | Schurecht | May 11, 1926 |
| 1,708,743 | Skaupy et al. | Apr. 9, 1929 |
| 2,207,723 | Deyrup | July 16, 1940 |
| 2,225,162 | Deyrup | Dec. 17, 1940 |
| 2,255,044 | Deyrup | Sept. 9, 1941 |
| 2,225,160 | Deyrup | Dec. 17, 1940 |
| 2,247,331 | Ferguson | June 24, 1941 |
| 1,765,287 | Scott | June 17, 1930 |
| 1,449,793 | Taylor | Mar. 27, 1923 |
| 1,652,259 | Taylor | Dec. 13, 1927 |
| 1,615,247 | Taylor | Jan. 25, 1927 |
| Re. 13,766 | Macbeth | July 7, 1914 |
| 1,097,600 | Macbeth | May 19, 1914 |
| 1,143,788 | Schnelbach | June 22, 1915 |
| 1,327,569 | Teregrine | Jan. 6, 1920 |
| 1,529,259 | Locke et al. | Mar. 10, 1925 |
| 1,721,979 | Taylor | July 23, 1929 |
| 1,271,652 | Bellamy | July 9, 1918 |
| 1,508,455 | Kraus | Sept. 16, 1944 |
| 1,513,923 | Montgomery | Nov. 4, 1924 |
| 1,864,858 | Rising | June 28, 1932 |
| 1,192,474 | Taylor | July 25, 1916 |
| 1,233,486 | Locke | July 17, 1917 |
| 1,737,685 | Rising | Dec. 3, 1929 |
| 1,754,065 | Taylor | Apr. 8, 1930 |
| 1,754,182 | Taylor | Apr. 8, 1930 |
| 1,815,812 | Taylor | July 21, 1931 |
| 1,394,296 | Fisher | Oct. 18, 1921 |
| 1,623,301 | Brenner | Apr. 5, 1927 |

FOREIGN PATENTS

| Number | Country | Date |
|---|---|---|
| 223,837 | Great Britain | 1924 |
| 223,295 | Great Britain | 1925 |
| 200,020 | Great Britain | 1923 |
| 3,007 | Great Britain | 1874 |
| 707 | Great Britain | 1755 |
| 4,139 | Great Britain | 1881 |
| 11,016 | Great Britain | 1888 |
| 16,165 | Great Britain | 1906 |
| 601,470 | France | 1925 |
| 753,908 | France | 1933 |
| 388,118 | Great Britain | 1933 |

OTHER REFERENCES

Scientific American, April 12, 1890, p. 228.